(12) United States Patent
Stibel et al.

(10) Patent No.: US 8,712,789 B2
(45) Date of Patent: *Apr. 29, 2014

(54) PEOPLE ENGINE OPTIMIZATION

(71) Applicant: Credibility Corp., Malibu, CA (US)

(72) Inventors: Jeffrey M. Stibel, Malibu, CA (US); Aaron B. Stibel, Malibu, CA (US)

(73) Assignee: Credibility Corp., Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,558

(22) Filed: Oct. 3, 2013

(65) Prior Publication Data

US 2014/0040230 A1 Feb. 6, 2014

Related U.S. Application Data

(63) Continuation of application No. 13/896,125, filed on May 16, 2013, now Pat. No. 8,600,768, which is a continuation of application No. 13/736,276, filed on Jan. 8, 2013, now Pat. No. 8,468,028, which is a continuation of application No. 13/486,873, filed on Jun. 1, 2012, now Pat. No. 8,374,885.

(60) Provisional application No. 61/492,102, filed on Jun. 1, 2011.

(51) Int. Cl.
| | | |
|---|---|---|
| *G06Q 30/02* | (2012.01) | |
| *G06Q 10/10* | (2012.01) | |
| *G06Q 10/06* | (2012.01) | |
| *G06Q 30/06* | (2012.01) | |
| *G06Q 10/08* | (2012.01) | |
| *G06Q 30/00* | (2012.01) | |

(52) U.S. Cl.
CPC .................................. *G06Q 30/018* (2013.01)
USPC ........................................... 705/1.1; 705/317

(58) Field of Classification Search
CPC .................................................... G06Q 30/018
USPC ................................................... 705/1.1, 317
See application file for complete search history.

(56) References Cited

U.S. PATENT DOCUMENTS

| | | |
|---|---|---|
| 7,577,647 B2 | 8/2009 | Graefe et al. |
| 7,693,833 B2 | 4/2010 | Nagle |
| 8,019,689 B1 | 9/2011 | Nachenberg |
| 8,150,735 B2 | 4/2012 | Walker et al. |
| 2006/0253458 A1 | 11/2006 | Dixon et al. |
| 2006/0253580 A1 | 11/2006 | Dixon et al. |
| 2006/0253584 A1 | 11/2006 | Dixon et al. |
| 2008/0005223 A1 | 1/2008 | Flake et al. |
| 2009/0276233 A1 | 11/2009 | Brimhall et al. |
| 2009/0319342 A1 | 12/2009 | Shilman et al. |

(Continued)

*Primary Examiner* — Jonathan Ouellette

(74) *Attorney, Agent, or Firm* — Los Angeles Patent Group; Arman Katiraei

(57) ABSTRACT

Some embodiments promote website credibility and the optimization of websites for people by automatedly quantifying various elements of a website into component credibility scores. In some embodiments, a set of encoded credibility scoring rules are used to compute each of the component credibility scores, wherein the credibility scoring rules are derived based on factors that have been identified by a grouping of people that preferably represent a primary demographic of users that consume the content of a particular classified type of website. In some such embodiments, the credibility scoring rules are derived from commonality that is identified from a sample set of known credible and/or non-credible websites of a particular classification. Once the credibility scoring rules are defined, the system applies the rules to other websites having the same classification as those from which the rules are derived to automatically generate credibility scores for the other websites.

19 Claims, 9 Drawing Sheets

(56) References Cited

U.S. PATENT DOCUMENTS

| | | |
|---|---|---|
| 2010/0198836 A1 | 8/2010 | Glass et al. |
| 2010/0287103 A1 | 11/2010 | Mason |
| 2011/0231282 A1 | 9/2011 | Dai |
| 2011/0251926 A1 | 10/2011 | Chen et al. |
| 2011/0264490 A1 | 10/2011 | Durvasula et al. |
| 2011/0282888 A1 | 11/2011 | Koperski et al. |
| 2011/0301986 A1 | 12/2011 | Pappas et al. |
| 2011/0307279 A1 | 12/2011 | Pappas et al. |
| 2011/0313877 A1 | 12/2011 | Pruett |
| 2012/0004956 A1 | 1/2012 | Huston et al. |
| 2012/0072384 A1 | 3/2012 | Schreiner et al. |
| 2012/0101881 A1 | 4/2012 | Taylor et al. |
| 2012/0101887 A1 | 4/2012 | Harvey et al. |
| 2012/0116828 A1 | 5/2012 | Shannon |

PEOPLE ENGINE OPTIMIZATION

CLAIM OF BENEFIT TO RELATED APPLICATIONS

This application is a continuation of the U.S. nonprovisional patent application Ser. No. 13/896,125 entitled "People Engine Optimization" filed on May 16, 2013 which is a continuation of the U.S. nonprovisional patent application Ser. No. 13/736,276 entitled "People Engine Optimization" filed on Jan. 8, 2013, now U.S. Pat. No. 8,468,028, which is a continuation of the U.S. nonprovisional patent application Ser. No. 13/486,873 entitled "People Engine Optimization" filed on Jun. 1, 2012, now U.S. Pat. No. 8,374,885, which claims the benefit of U.S. provisional application 61/492,102, entitled "People Engine Optimization", filed Jun. 1, 2011. The contents of application Ser. Nos. 13/896,125, 13/736,276, 13/486,873 and 61/492,102 are hereby incorporated by reference.

TECHNICAL FIELD

The present invention pertains to a system, methods, and software products for determining credibility of websites.

BACKGROUND

Internet content is a mixture of informative, artistic, entertainment, and for profit content. One of the primary benefits of the Internet is that anyone can quickly, easily, and economically create content that is hosted and served to others in the form of one or more websites. However, this content can also be intermixed with false information, spam, malware, adware, and other elements that are intended to defraud, harass, deceive, or otherwise mislead content consumers. It can be difficult for a user that is a content consumer to distinguish between credible and non-credible content. As a result, the user may be misled into buying a good or service that it does not want or is different than the content consumer's expectations, provide confidential information to a non-credible entity that can then misappropriate that information for nefarious purposes, or the user may simply consume information that is represented as truthful and accurate, but is instead falsified or misrepresented.

The burden of distinguishing between credible and non-credible websites is mostly left to the user. Some users identify a credible website that hosts credible content as one that is authoritative or a primary source for the content that it distributes. Some examples of authoritative or primary source content creators are sources like www.cnn.com, www.microsoft.com, and www.uspto.gov. Some users identify a credible website as belonging to an established and trusted business or one that offers goods and services from credible sources (i.e., well known and established dealers, manufacturers, service providers, etc.). For example, users that purchase goods from www.apple.com are assured that the Apple® products they purchase made and warranted by the manufacturer. Still some users identify a credible website based on the amount of spam, malware, adware, and the like that is present on such a website. The more banner advertisements and pop-ups, the more likely the website is one that is not credible. In any of these and other cases, the credibility of a website is based on the knowledge and experience of the user. Less Internet savvy users are more likely to be duped by the non-credible websites and are thus more prone to fraud, misappropriation of confidential information, and consumption and dissemination of falsified or inaccurate information.

Some automated tools currently exist to aid better aid the user in gauging the credibility of a website. One such tool is the search engine. Search engines such as Google, Bing, and Yahoo, identify websites that are of potential interest to a user based on one or more query parameters provided by the user. The search engine ranks the websites that match a user query based on relevancy factors. These relevancy factors account the closeness of the user's query parameters to words that appear in a website and a website's popularity as determined by the number of incoming links to the website as some examples. However, these relevancy factors and the search engine rankings that are derived from the relevancy factors usually do not account for credibility. As a result, some users incorrectly assume that the highest ranked websites (i.e., first presented websites in the search engine results) not only provide the most relevant content, but also provide content that is trustworthy, accurate, and credible. Some users also assume that the first few presented search engine results are usually authoritative or are the primary source of the content that they distribute and that the distributed content is spam-free.

Besides the fact that the search engine rankings do not account for website credibility, the rankings can also be manipulated such that a non-credible website will appear higher in the rankings, thereby causing a user to improperly perceive that website as being more credible than it is. Search engine manipulation is the byproduct of abuses in search engine optimization. More specifically, non-credible websites can be optimized with content, keywords, links, etc. such that they are ranked highly when a user searches for certain keywords even though the websites may in fact have little to do with the searched for keywords or the websites are relevant to the search for keywords, but contain spam, are intended to defraud, or contain inaccurate or falsified information. In summary, search engine optimization can be used to make a website that is irrelevant, full of spam, or that contains other non-credible content to appear in the search rankings to be more relevant than it is and, as a result, appear to some users as being more credible than it is.

Search engine optimization can also have the effect of making credible websites appear to be less credible. For instance, a website creator may repeat various keywords unnecessarily, create extraneous content, and perform other optimizations that improve the website's ranking in the search engines, but that pollute the website with confusing and unnecessary information that makes the desired for content hard to find. Such a website can be perceived as being less credible when the sought after content is hard to find, surrounded by unnecessary text (e.g., repeated words or phrases), hyperlinks, or visual elements, and this unnecessary text, hyperlinks, and visual elements are needed to improve the website's rankings in the various search engines. Stated differently, search engine optimization results in websites that are optimized for search engines and not for the people that consume the content from those websites. As a result, the subjective criteria used by people to gauge the website's credibility is sometimes ignored or left to be a secondary concern for search engine rankings or search engine optimized websites.

A further shortcoming of using search engine results as an indicator for website credibility is the fact that some search engines do not consider the amount of "spam" elements on the website when ranking the website. For instance, a particular website may be the highest ranked website because of the amount of content it contains relating to a particular subject and because of the number of links that point to that particular website. However, this same website may be littered with banner ads, annoying flashing graphics unrelated to the primary content, poor contrast between text and background images that make the actual text difficult to read, large videos or graphics that increase the download time for the website, pop-ups, etc. When a user visits such a website and is bombarded with these and other spam elements, the user may immediately identify the site as non-credible. Consequently, the user is less likely to complete a commercial transaction at that website resulting in financial loss to the website. Also, the user is less likely to remain at the website to consume content or become interested in advertising or other promotions of the website. These and other factors highlight the importance of not only having a relevant website, but one that is also perceived as being credible.

Today, review websites exist to assist a user in ascertaining the credibility of a website. At these review websites, users rate a website and express their opinions about that website such that others can ascertain the credibility of a website based on the experiences of others. However, the problem with understanding credibility through this approach is that the credibility data is at a third party site. Therefore, the user must first lookup a website of interest at the third party site in order to ascertain that website's credibility before accessing the website. Another shorting coming of such review websites is that the credibility data at these websites is not derived using the same set of rules or criteria for all websites that are similarly classified. For example, an overly critical reviewer may find fault with an irrelevant feature of a first website and an overly sympathetic reviewer may ignore a glaring issue of a second website. A small set of only negative reviews may also fail to adequately convey the credibility of a website. The reviews may come from users that are not from the primary demographic to which the website caters to. Accordingly, user submitted reviews cannot be used to accurately gauge the credibility of a website. More importantly, the subjectivity and inconsistent sampling of reviews does not allow a website administrator or user to comparatively gauge the credibility of one website relative to other similarly classified websites.

Accordingly, there is a need to better promote website credibility so that the content that is placed on the Internet is optimized for people. To promote people optimized websites, there is a need to automatedly identify and quantify factors that people use to gauge credibility. Such factors extend beyond the relevancy of the content and include the presentation of the content as well as the accuracy, trustworthiness, and safety of the content being presented. There is a need to provide the identified and quantified factors to website administrators so that they may appreciate the website elements that beneficially and detrimentally affect their websites' credibility and so that the administrators can take directed action to better optimize the credibility of their websites. There is also a need to better enable users to identify credible websites from non-credible websites. In so doing, users are provided a better online experience and are protected from non-credible sites.

SUMMARY OF THE INVENTION

It is an objective of the present invention to define a system, methods, and computer software products to promote website credibility and the optimization of websites for people. It is an objective to automatedly quantify various elements of a website into component credibility scores from which an overall credibility score for the website is derived. It is objective to automatedly derive the component credibility scores based on factors that people (constituting a primary demographic of the content consumers for that website) have identified to be of significance when gauging the website's credibility. Moreover, it is an objective that the set of identified factors be encoded into a set of rules. The set of rules can then be applied to a set of websites that are within a particular classification in order to produce credibility scores for each website in the set of websites, wherein the credibility scores for the set of websites is computed based on the same set of factors, thereby producing standardized and normalized credibility scores that can be used for comparative analysis.

In some embodiments, the credibility scores (i.e., overall and component) are provided to website administrators so that the administrators may identify those website elements that beneficially and detrimentally affect their websites' credibility. In response, the website administrators may perform credibility optimizations to their websites. Such optimizations improve the credibility of the websites by improving user perception of the websites. Consequently, a user is more likely to remain on the website, thereby increasing the likelihood of the user completing a commercial transaction through the website or increasing the likelihood that the user relies on the website for accurate and trustworthy content.

In some embodiments, the credibility scores are provided through a toolbar or via web browser functionality to users that want ascertain the credibility of a website prior to visiting the website or while visiting the website. In some embodiments, the credibility scores are used to reorder traditional search engine ranking results such that the ordering accounts for the credibility as determined by the system and methods described herein in addition to or instead of the relevancy factors ordinarily utilized by search engines to rank websites.

To achieve these and other objects, some embodiments provide a people engine optimization (PEO) system. The PEO system computes credibility scores for different websites to quantify their credibility based on people identified credibility factors. The credibility scores include an overall credibility score that is derived from various component credibility scores. Each component credibility score quantifies the credibility that is associated with a particular factor of a website as embodied by one or more elements of the website.

In some embodiments, the PEO system utilizes a set of encoded credibility scoring rules to compute each of the component credibility scores. In some embodiments, the credibility scoring rules are derived based on factors that have been identified by a grouping of people that preferably represent a primary demographic of users that consume the content of a particular classified type of website. However, it should be apparent that the grouping of people can include any sampling of users. Specifically, the grouping of people is presented a sampling of websites for the particular classified type of website. For example, when the particular classified type of website is an e-retailer (i.e., online store), the grouping of people may be presented with a sampling of sites such as www.amazon.com, www.buy.com, and www.walmart.com. The grouping of people analyzes the websites to identify factors for different website elements that beneficially or detrimentally impact the credibility of the websites. Some such factors include stylization factors such as coloring, fonts, sizes, and number of advertisements. The grouping of people provides a weight to each identified factor. The weight quantifies how much of an effect the identified factor has on the overall credibility of the website as perceived by the user identifying the factor. The PEO system obtains a listing of the identified factors and analyzes the factors for commonality. Any factor that has been identified and weighted similarly by a threshold number of people is encoded into a credibility scoring rule. In encoding a credibility scoring rule, the PEO system defines an algorithm for automatedly quantifying the factor that is associated with a particular website element into a component credibility score. The credibility scoring rule can then be automatically applied to other websites with the same particular website element in order to compute a credibility component score for each such website. By applying the same credibility scoring rule to different websites, the PEO system is able to compute a standardized credibility component score for all such websites that is unaffected by individual biases or inconsistent interpretation. In this manner, the credibility scoring rules are derived using a judgmental approach.

In some embodiments, the PEO system derives the credibility scoring rules using an empirical approach. In some such embodiments, the credibility scoring rules are derived from commonality that is identified from a sample set of known credible and/or non-credible websites of a particular classification. The sample set of known credible websites of a particular classification are identified based on aggregated positive reviews, website popularity, etc. The identified sample set of known credible websites of a particular classification are programmed into the PEO system for analysis. Next, the PEO system cross compares the identified websites to identify commonality between the identified websites. Specifically, commonality is identified when a sufficient number of the identified websites include the same or similar website elements. Commonality between websites of a sample set of known credible websites identifies one or more website elements that benefit website credibility for websites of the same particular classification as the sample set. Similarly, commonality between websites of a sample set of known non-credible websites identifies one or more website elements that are detrimental to website credibility for websites of the same particular classification as the sample set. The PEO system may include various visual matching routines and website crawlers to automate the identification of commonality. PEO system administrators can also manually identify the commonality between the sample set of websites. The identified commonality is then encoded to a credibility scoring rule. The credibility scoring rule is then applied to other websites of the particular classification as the sample set of websites. In so doing, the PEO system automatically computes a component credibility score for the other websites, wherein the computed credibility component score is standardized because it is derived from the same rules for all websites, thereby eliminating individual biases or inconsistent interpretation.

Once the credibility scoring rules are defined using either the judgmental or empirical approaches described above, the PEO system applies the rules to other websites having the same classification as those from which the rules are derived. The different sets of rules are derived because different factors play into the credibility for differently classified websites. For instance, a news website will be deemed credible based on different factors than a video game website. To compute the component credibility scores and the overall credibility score for a website based on the defined credibility scoring rules, a website is first retrieved by the PEO system and parsed into its elements. The website is classified. In some embodiments, classification involves identifying a primary demographic of users for the website. Based on the classification, a set of credibility scoring rules relevant to the website classification are retrieved. The appropriate parsed elements are passed as inputs to the set of credibility scoring rules and different component credibility scores are computed for some of the elements. From each component credibility score derived for a particular website, an overall credibility score is computed.

To complement the computed credibility scoring rules, the PEO system may also incorporate third party data that identifies credibility of a website. For example, the PEO system may aggregate the number of Facebook "likes" for a particular website and use that information in the computation of a component credibility score that is accounted for in the website's overall credibility score.

In this manner, the credibility of different is automatedly derived. Since the same set of credibility scoring rules are applied to similarly classified websites, the credibility scores can be comparatively analyzed and reference to other websites can be made in order to precisely determine what constitutes a credible element and a non-credible element.

In some embodiments, the PEO system provides the component credibility scores to website administrators. In so doing, the PEO system provides the website administrators with targeted insight about which elements beneficially or detrimentally impact the credibility of the administrator's website. Based on this information, the administrator can take targeted action to improve website credibility.

In some embodiments, the PEO system provides the component credibility scores to users that are content consumers consuming content presented at various websites. In so doing, the PEO system provides an unbiased and automated system to notify users as to which websites are credible or non-credible. Consequently, users have a more enjoyable web browsing experience and are less likely to be subjected to spam, fraud, or misinformation. Moreover, users are provided the credibility scores as they browse the web without the need to read reviews and ratings on the credibility of a website at a third party site before accessing that website. To facilitate such a user browsing experience, some embodiments provide the credibility scores through a toolbar application that runs in conjunction with a web browser application. Whenever, the web browser points to a new website, the toolbar automatically queries the PEO system for the credibility score that is associated with that website. The credibility score is presented in the toolbar as the website loads on the web browser application. The credibility score can also be used to ensure a safe browsing experience. Specifically, when the credibility score for a particular website falls below some threshold value, the toolbar can halt the loading of the particular website until the user confirms that he/she is aware of the low credibility score of the particular website and that the user wishes to continue loading the particular website. In some embodiments, the credibility scores are integrated with search engine results such that when a pointing tool hovers over a search engine result, the credibility score that is associated with the website represented by that result is presented. In some embodiments, the credibility scores are used to reorder search engine results. In some such embodiments, a user performs a search engine query. The results from the search engine are intercepted by the PEO system and reordered according to the credibility scores associated with each of the websites returned by the search engine.

BRIEF DESCRIPTION OF THE DRAWINGS

In order to achieve a better understanding of the nature of the present invention a preferred embodiment of the People Engine Optimization system and methods will now be described, by way of example only, with reference to the accompanying drawings in which.

DETAILED DESCRIPTION OF THE INVENTION

Figure 1:
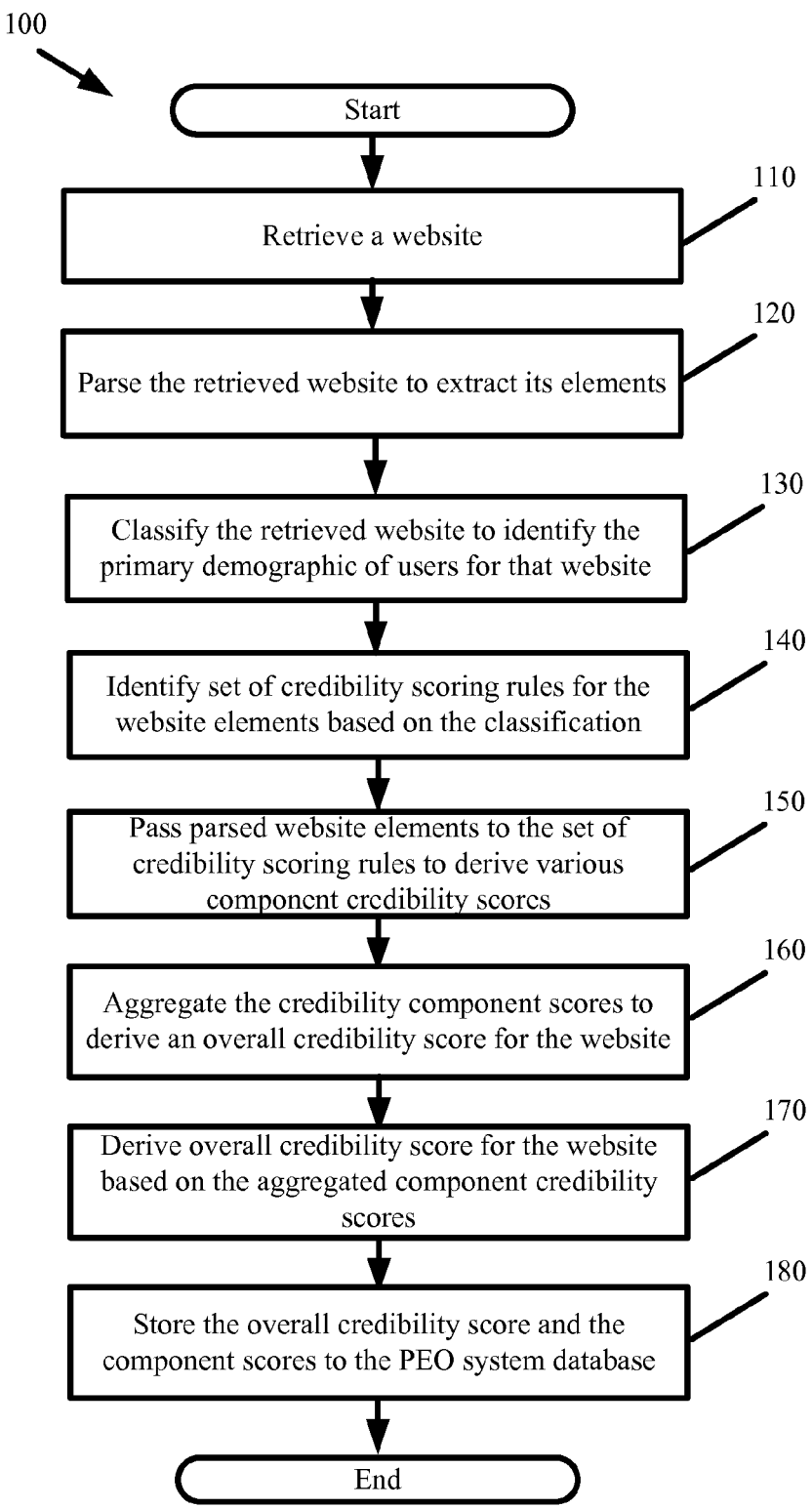
FIG. 1 presents a process for determining the credibility of a website in accordance with some embodiments.

In the following detailed description, numerous details, examples, and embodiments of a People Engine Optimization (PEO) system and methods are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments herein described.

I. Overview

Website credibility is difficult to quantify, because it is primarily predicated on subjective factors. Moreover, these subjective factors differ from one type of website to another based on the preferences of the people that primarily access the websites. For instance, the factors that make a shopping website (i.e., e-retailer) credible are different than the factors that make a business informational website (i.e., homepage) or news website credible. In any case, website credibility is one of the primary forces driving traffic to a website and keeping traffic at the website. A credible website is one that users feel comfortable interacting with, obtaining information from, and providing information to including providing financial and confidential information. Stated differently, a credible website is one that contains few or no spamming elements, does not defraud, and clearly and directly provides accurate and trustworthy information. Examples of some other factors driving traffic and keeping traffic at the website include the relevancy, value, and timeless of information that is presented at the website.

It is important for website administrators to be able to understand their websites' credibility and, more importantly, to be able to optimize the credibility of their websites. Understanding website credibility helps explain certain trends in user access to a website. For example, why users view a homepage but not other pages that are linked to from the homepage or why a website attracts a particular demographic of users but not other demographics of users. After understanding website credibility, the website administrator can then optimize the site on the basis of credibility. This optimization is referred to herein as People Engine Optimization (PEO). A people optimized website attracts new users while keeping existing users better engaged.

It is also important for users to understand website credibility. Understanding website credibility allows a user to avoid websites that perpetrate fraud, avoid websites that contain lots of spam, avoid websites that disseminate falsified or inaccurate information, and avoid websites that sell goods or services that misrepresent the true origin or quality of the goods or services. Additionally, users that are able to distinguish between credible and non-credible websites will be less likely to have their confidential information stolen or misappropriated and will have a more enjoyable and efficient web browsing experience as they will be able to quickly access the information, goods, or services that they seek.

To meet these objectives, some embodiments provide a People Optimization Engine (PEO) system and methods that automatedly analyze different websites and compute credibility scores for those websites based on subjective factors that have been identified preferably by a primary demographic of users for those websites. FIG. 1 presents a process 100 for determining the credibility of a website in accordance with some embodiments. The process 100 is performed by the PEO system which is described in detail below.

The process 100 begins by automatically retrieving (at 110) a website for which one or more credibility scores are to be computed. Retrieving a website includes downloading a base HyperText Markup Language (HTML) page, downloading all embedded objects that are included within the base HTML page, executing or otherwise performing scripts or applications that are part of the base page, and/or rendering the website. Retrieving a website may further include downloading internally linked websites and analyzing the aggregate set of websites. Website retrieval is ordinarily performed by the PEO system submitting a HyperText Transfer Protocol (HTTP) GET request to a server that hosts the website of interest. In response, the server passes the HTML page, embedded objects, scripts, and applications to the PEO system using a packet based protocol such as the Internet Protocol (IP) and preferably where a connection oriented protocol such as the Transmission Control Protocol (TCP) facilitates a reliable transfer of the HTML page, embedded objects, scripts, and applications.

The process parses (at 120) the retrieved website into its component elements. Parsing is performed by identifying specific delimiters within the website such as HTML tags as some examples. As used herein, website elements include any object of the website (interactive, executable, visual, or hidden), any attribute for an object, or other aspects of the website that are derived from the objects. Some examples of website elements include graphics, advertisements, coloring, font, text, hyperlinks, scripts, interactive tools, input fields, number of advertisements, number of different colors, or any other object that is specified using HTML, JavaScript, ActiveX, Cascading Style Sheets (CSS), XML, and other similar languages. The PEO system may utilize a website crawler or automated script to parse and identify the component elements.

Next, the process classifies (at 130) the retrieved website. Classification is performed on the basis of various identifiers appearing within the website or its meta-data. For example, when the sports related terms repeatedly appear in the text of the website, that PEO system can classify that website as a sports related website. As another example, if the same sports website includes pricing and a shopping cart option, then the PEO system can further classify the website as a sports website, a shopping website, or a sports shopping website. Classification may also be performed by looking up the domain name or Uniform Resource Locator (URL) of the website in a classification database. Classifications can be enumerated with any desired degree of granularity. For example, a video gaming website may be classified as an entertainment website or that same website may be classified as an entertainment website that pertains to males age 15-35 with average income of $25,000-$60,000.

Based on the classification performed at 130, the process identifies (at 140) a set of credibility scoring rules that will be used to compute various component credibility scores and the overall credibility score for the retrieved website. The identified set of credibility scoring rules define the elements of the retrieved website that will be considered in computing the credibility score for the retrieved website and how the credibility score will be quantified for those elements. In this manner, all websites of a given classification will have their component credibility scores and overall credibility score computed subject to the same set of rules such that the scores can be cross compared.

The parsed website elements are passed (at 150) as inputs to the set of credibility scoring rules. As output, the set of credibility scoring rules derive various component credibility scores for the retrieved website. The component credibility scores are computed on an element by element basis such that users and website administrators can appreciate exactly which parts of the website are considered credible and which parts of the website are considered not credible. Each component credibility score represents a quantification for the credibility of a particular element of a website. Specifically, a quantification based on the attributes defined for the particular element or a quantification based on the presence of the particular element. Each component credibility score may be represented as a numerical value, though alternative representations may also be used. For example, a first credibility scoring rule accepts as input one or more website elements for the font and coloring of the website with attributes of the website elements defining the specific font and specific coloring. Then, based on the first credibility scoring rule, a first component credibility score of 7/10 for the specific font and specific coloring of the website is computed and presented to a user or website administrator to indicate that the specific font and specific coloring is not considered to be detrimental to the credibility of the website. Similarly, a second credibility scoring rule accepts as input one or more website elements related to the number and positioning of advertisements of the website.

Then, based on the second credibility scoring rule, a second component credibility score of 3/10 for the number and positioning of advertisements appearing on the website is computed and presented to a user or website administrator to indicate that the number and positioning of the advertisements causes the website to be considered as less credible. In other words, the credibility component score indicates that users are more likely to click away from that website or spend less time on that website as a result of the number and positioning of the advertisements on the website, wherein the credibility score rule has determined that the number and positioning of the advertisements on the website is considered spamming, thereby resulting in the lower credibility component score. The website administrator can then directly respond and improve its credibility by removing or reducing the size of the advertisements on its website. Also, users can view the first and second component credibility scores and ascertain that the website does not necessarily contain harmful content, but is replete with unnecessary advertisements. In summary, each component credibility score is intended to provide a quick and easy to understand reference as to which website elements are beneficial to the credibility of the website and which website elements are detrimental to the credibility of the website.

The process aggregates (at 160) the component credibility scores to derive an overall credibility score for the website. Different websites may have different numbers of component credibility scores based on the elements of the website. Preferably however, component credibility scores are derived for at least a basic set or standard set of elements that all websites include, such as coloring, fonts, number of images, number of advertisements, etc.

The process then derives (at 170) the overall credibility score for the website based on the aggregated component credibility scores for that website. The overall credibility score is derived based on its parts (i.e., the component credibility scores) and provides an overall impression as to the credibility of the website. In some embodiments, deriving the overall credibility score involves computing the average for all the component credibility scores. In some other embodiments, deriving the overall credibility score involves applying different weights to different component credibility scores so that some scores impact the overall credibility score more so than other component credibility scores. The overall credibility score is also a numeric representation that is quick and easy to understand. The overall credibility score and each of the component credibility scores can be presented in a range or can include a percentage to provide a comparative reference with respect to the scores of other websites. Moreover, the scores of different websites are computed using the same scoring rules in order to enable a cross comparison of the scores. This cross comparison allows a user to see how the credibility of a particular website compares to the credibility of other websites. As a result, the scores can serve as a guide to a safer and more enjoyable web browsing experience in which browsing is not only predicated based on relevancy factors of websites as identified by search engines, but also based on credibility factors including reputation, trustworthiness, etc. as identified by the PEO system.

The process stores (at 180) the overall credibility score and the component credibility scores to a PEO system database for subsequent distribution to website administrators, PEO system tools (e.g., software toolbar), or third parties (e.g., search engines). The scores can be periodically updated by executing another iteration of the process 100. The process 100 can be executed on a website whenever content on that website changes, formatting of the website changes, or on a recurring interval basis (e.g., every month).

As noted above, the overall credibility score and the various component credibility scores provide several advantages to website administrators and users or content consumers. Website administrators can utilize the credibility scores to optimize their websites based on the preferences of their users or content consumers. Generally, this entails optimizing the website so that the user experience is tailored to the likes of the primary demographic of users accessing the website. This may include, for example, making the provided content easier to see, replacing elements (e.g., fonts, coloring, images, etc.) appearing within the website with elements that are preferred by users, and ensuring that the website does not include an excessive number of spam elements or includes elements preferred by the primary demographic of users (e.g., different graphics or advertisements). To this objective, the overall credibility score informs the website administrator as to the overall perception of the website's credibility which can be further used in comparatively assessing the credibility of the website in relation to other similarly classified websites. The component credibility scores inform the website administrator as to specific website elements that most detrimentally impact the credibility of the website and that can be better optimized. These scores are especially useful when website administrators are unaware of the impact that certain website elements have on their website's credibility or the website administrators simply do not have the resources or time to conduct a study to identify the preferences of their primary demographic. In some embodiments, the PEO system further provides recommendations or suggestions on how a website administrator can improve its website's credibility. In some such embodiments, the PEO system identifies the recommendations or suggestions from the credibility scoring rules. For instance, the PEO system may compute a low component credibility score for a particular website element of a website. Then, based on the credibility scoring rule used to derive the component credibility score, the PEO system identifies what specific changes can be made to that particular website element to improve upon its credibility. These recommendations or suggestions can be provided for any component credibility score for which a credibility scoring rule is derived. Furthermore, these recommendations or suggestions can be provided as part of a premium or paid-for service of the PEO system.

Users can also utilize the credibility scores to better understand the credibility of a website. This is especially useful for unknowledgeable or less experience users that have difficulty in identifying desired content or often are the targets of spammers, phishing websites, and the like. Using the credibility scores, users can ascertain whether a particular site is credible before ever pulling up that website or engaging in further interactions with that website, such as by providing identification, financial, or confidential information to the website.

Some website elements that can impact the credibility of a website and that are quantified into component credibility scores by the PEO system include: advertisements, graphics, color, fonts, media objects, amount of content and its affect on the load-up time of the website, how verbose or direct a website is, and placement of information (easily accessible or hidden). For example, a credible website may include: text that is easily identifiable from background coloring or graphics, fonts that are within a specified range of sizes, a limited number of different fonts, a proportional number of graphics or advertisements to text, proper layout of graphics or advertisements to text (graphics are interspersed), content that is not hidden, does not contain tracking elements (e.g., scripts), includes a proportional number of hyperlinks, and obtains content from trusted sources. Other examples include whether the website identifies the principle agents or management (for a business website), clearly presents terms and services, clearly presents contact information with at least one of a telephone number, street address, and email address, clearly defines a refund policy or a shipping policy (for an e-commerce website), contains certifications or awards (e.g., Better Business Bureau, VeriSign Secured, etc.), and encrypts confidential information. Accordingly, credibility for some website elements is computed based on attributes defined for those elements, whereas the credibility for some other website elements is computed simply based on the presence or omission of those elements from the website.

The above listing provides an exemplary set of factors, however it should be apparent that what constitutes a credible website is ultimately determined based on the preferences of the primary demographic of users that access similarly classified websites. Some users of a first website classification may prefer graphics to text, whereas users of a second website classification may prefer text to graphics. More specifically, users of a gaming website will perceive a gaming website as more credible when it has a large number of screenshots and videos, whereas users of an academic or informative website will perceive an academic website as less credible when there is a disproportionate number of graphics to text. As another example, fashion related websites that primarily have the colors pink, red, and black may be perceived by their users as being more credible than other similarly classified websites. As evident, these subjective factors can vary greatly between different websites and it is for this reason that website credibility has previously been difficult to ascertain. However, by tailoring the credibility scoring rules to the preferences of the primary demographic of users for similarly classified websites, the PEO system can automatically and systematically produce credibility scores that are standardized and normalized for all websites fitting a particular classification.

II. PEO System

Figure 2:
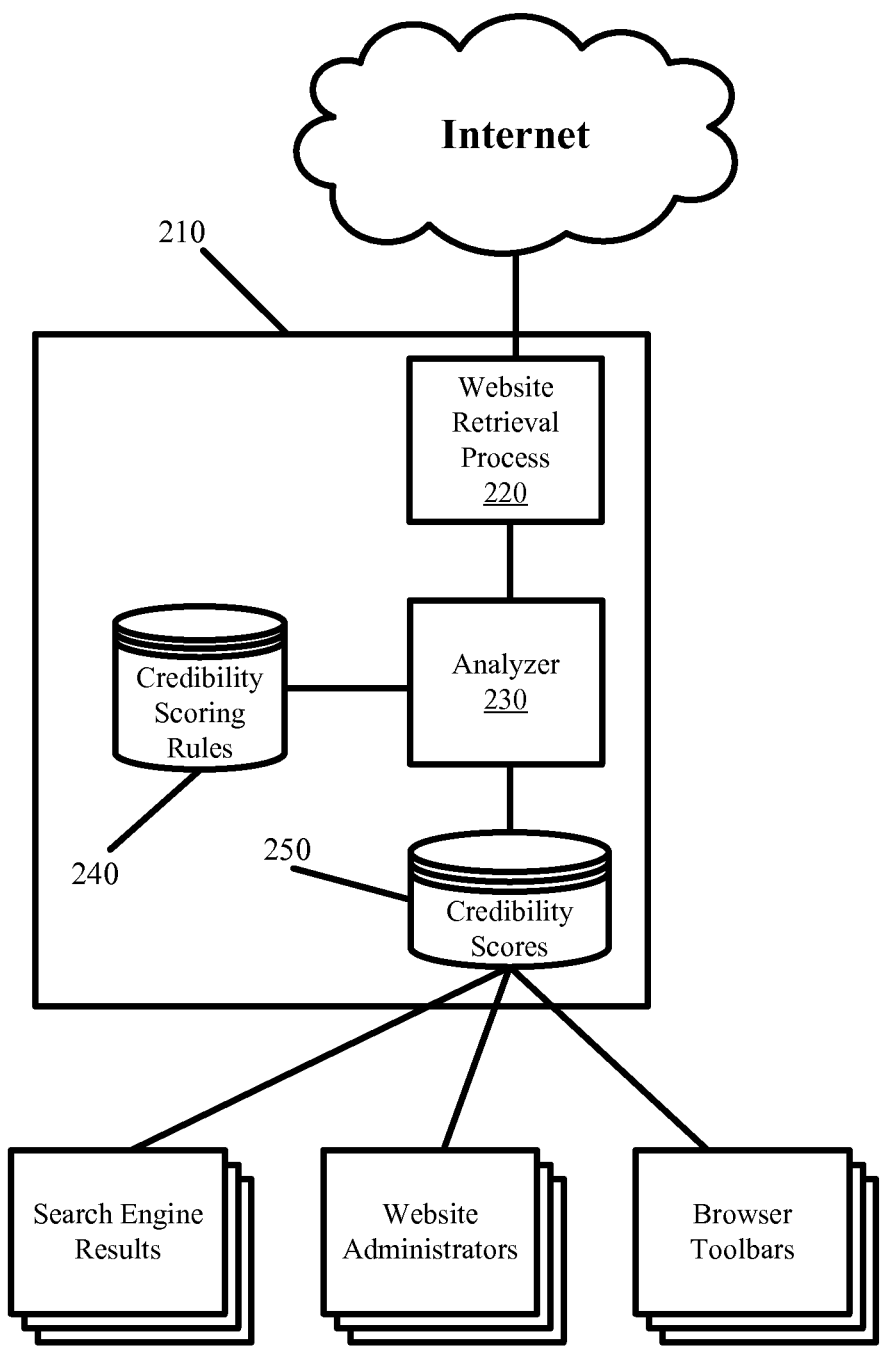
FIG. 2 presents components of the PEO system in accordance with some embodiments.

FIG. 2 presents components of the PEO system 210 in accordance with some embodiments. As shown, the PEO system 210 comprises website retrieval process 220, analyzer 230, credibility scoring rules database 240, and credibility score database 250. Some or all of these components 220-250 are embodied as software applications or processes that reside on non-transitory computer-readable media and that execute on one or more physical computing devices. The components 220-250 transform general purpose computing resources of the computing devices to implement and perform the PEO system functionality. In other words, the computing devices on which the PEO system 210 executes comprises general purpose processors, random access memory, non-volatile storage, and network resources that are transformed by the components 220-250 into one or more specific purpose machines that produce the credibility scores and that provide the other PEO system functionality that is described herein. Each of the components 220-250 may execute on separate physical computing devices with independent sets of resources or as virtual machines on a single computing device by sharing resources of the single computing device or by being allocated separate partitions of the resources of the single computing device.

A. Web Retrieval Process

In some embodiments, the website retrieval process 220 is an automated web crawler that obtains different websites from the Internet or other data network from which websites are accessible. The website retrieval process 220 utilizes a network interface of the PEO system that provides access to the Internet or other data networks to retrieve the different websites. The website retrieval process 220 retrieves different websites using standardized messaging protocols (e.g., IP, TCP, HTTP, etc.).

In some embodiments, a configuration file is provided to the website retrieval process 220 to specify the time and URLs or domains of the different websites that are to be retrieved. Alternatively, the website retrieval process 220 may be programmed to automatically retrieve a set of Internet websites over a specified interval (e.g., a range of Internet Protocol (IP) addresses to query). Retrieving a website involves downloading the content that is associated with the website. This includes downloading the base page that defines the layout and structure of the website as well as the embedded objects within the base page. The embedded objects may include text, graphics, advertisements, applications, videos, audio, and scripts as some examples. The embedded objects may be retrieved as a result of invoking hyperlinks that are specified in the base page. In some embodiments, the website retrieval process 220 is further tasked with rendering the retrieved websites and performing any applications or scripts therein, though rendering the retrieved websites may be optionally performed. In some embodiments, HTTP GET requests specifying different URLs or IP addresses are used to retrieve the websites. It is irrelevant what language or languages the website is defined with, as the task of the website retrieval process 220 is to retrieve the website regardless of its form or structure. Consequently, the retrieved websites may include HTML, JavaScript, Adobe® Flash, or any other formatting, objects, containers, languages, etc.

Retrieved websites may be stored to memory or a database for subsequent processing by the analyzer 230. Alternatively, retrieved websites may be directly passed to the analyzer 230 for processing as described in the section below.

B. Analyzer

In some embodiments, the analyzer 230 is the component of the PEO system 210 that computes the credibility scores for the retrieved websites. To do so, the analyzer 230 obtains a website that has been retrieved by the website retrieval process 220. Next, the analyzer 230 parses the website to identify its various elements.

In some embodiments, the analyzer 230 parses a website by identifying and extracting a set of delimiters (or tags) and their corresponding parameters and attributes. A PEO system administrator may specify the set of delimiters that are to be parsed and how the delimiters are to be classified based on their parameters and attributes. In some embodiments, specified delimiters that are not present in a retrieved website are ignored and not used in computing a component credibility score. In some embodiments, specified delimiters that are not presented in a retrieved website may impact the overall credibility score of the website and used to identify additions that can be made to the website in order to bolster its credibility.

Parsing the web site elements includes identifying objects of the website (interactive, executable, visual, or hidden), attributes for the objects, and other aspects of the website that are derived from the objects. Some examples of identifiable website elements include graphics, advertisements, coloring, font, text, hyperlinks, scripts, interactive tools, input fields, number of advertisements, number of different colors, or any other object that is specified using HTML, JavaScript, ActiveX, Cascading Style Sheets (CSS), XML, and other similar languages. These elements can be used to identify the presence of other objects such as whether a website provides terms and services, clearly presents contact information, identifies the principles or management, clearly presents a refund or shipping policy, etc. It should be apparent that this enumeration is presented for exemplary and explanatory purposes and is not intended to be limiting. For instance, the analyzer 230 can identify the number of images within a particular website by identifying the number of times the delimiter "<img src=" appears in the website. The analyzer 230 can identify coloring used in a website based on the following delimiters as some examples: (1) <FONT COLOR="#[six digit hexadecimal value]">sample text</FONT>, (2) <BODY TEXT="#[six digit hexadecimal value]">, and (3) <BODY BGCOLOR="#[six digit hexadecimal value]">. Parsing of the website elements can also be performed by rendering the website and using visual scanning techniques to identify different elements therein. For example, certain elements within a website are dynamic and cannot be determined from the associated delimiters until the associated website code is executed and the corresponding element is rendered. More specifically, size and orientation of an image may be determined from the delimiters associated with the image. However, coloring of the image cannot be determined from the delimiters. Coloring may only be determined when the image is rendered and a visual scanning technique is used to analyze the coloring of the rendered image. It should be apparent to one of ordinary skill in the art that different techniques can be used to parse the website elements and therefore, the particular technique that is used is inconsequential. The parsed website elements are temporarily retained in memory until the website is classified and a set of credibility scoring rules are identified.

Figure 3:
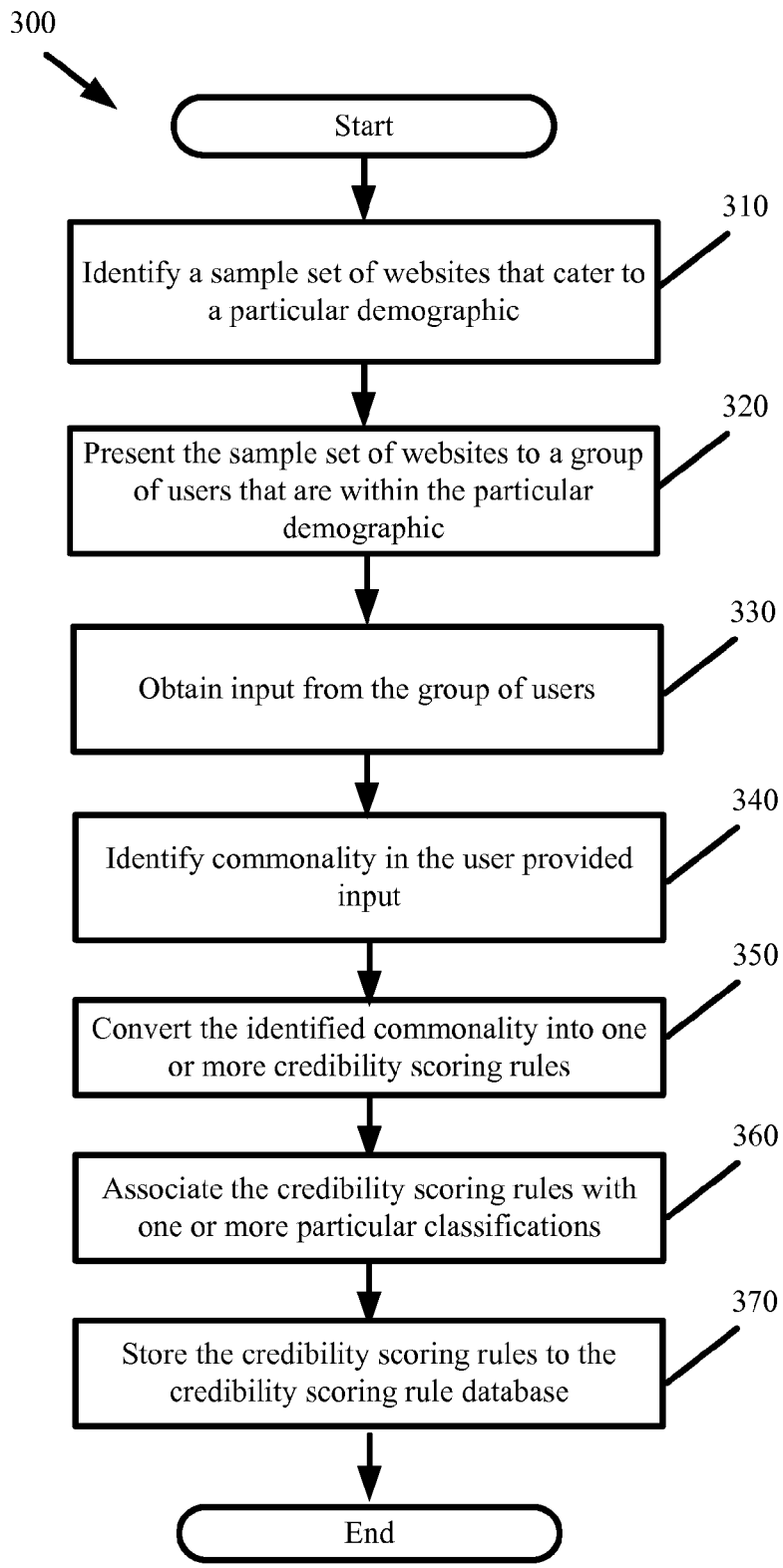
FIG. 3 presents a first process implementing a judgmental approach to defining credibility scoring rules in accordance with some embodiments.
Figure 4:
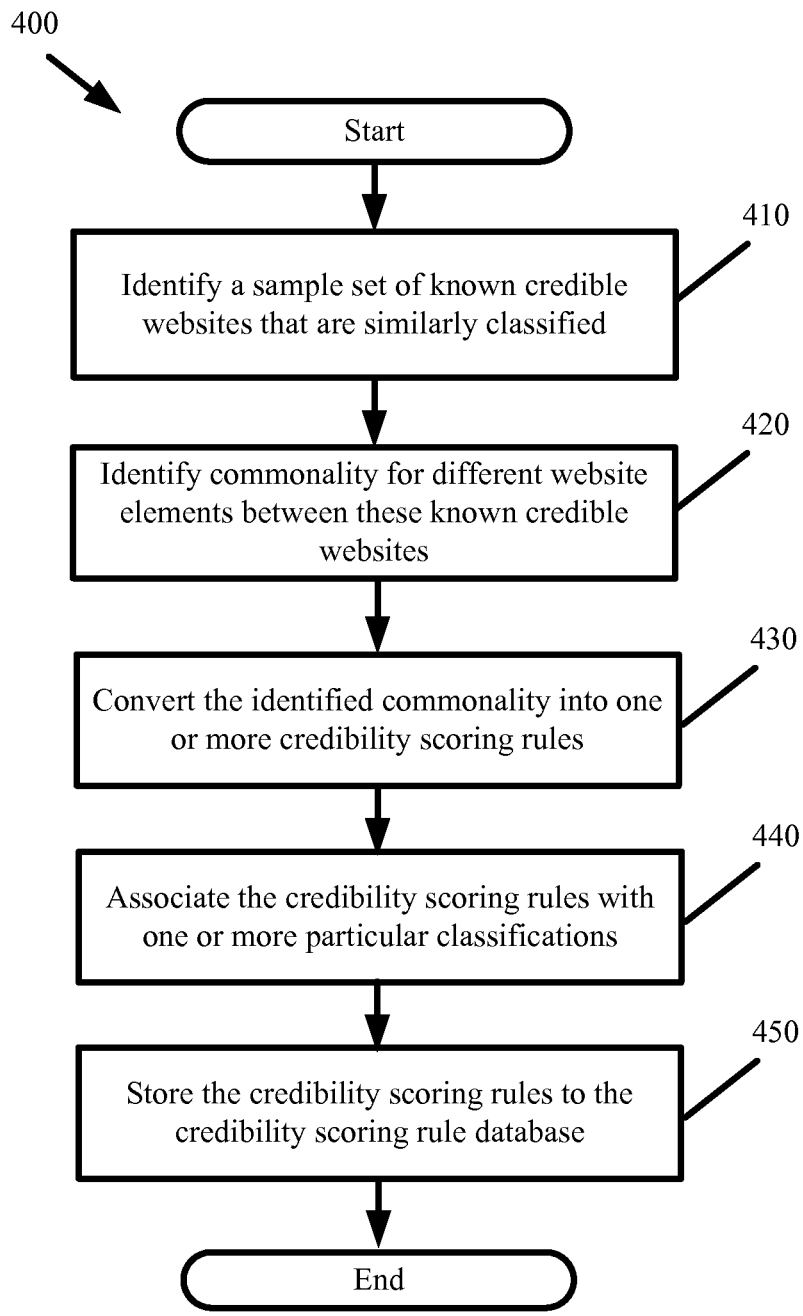
FIG. 4 presents a second process implementing an empirical approach to defining credibility scoring rules in accordance with some embodiments.

The analyzer 230 classifies the website into one or more classifications. The classifications are used to identify the set of credibility scoring rules to apply to the website in order to compute the component credibility scores and overall credibility score for that website. As different demographics of users will have different tastes and preferences, the classifications are used to identify credibility scoring rules for differently classified websites. In other words, the selected set of credibility scoring rules reflect the preferences or identified subjective factors that the primary demographic of users for that particular classification of website use to gauge the website's credibility. In this manner, the credibility of a shopping website is computed differently than the credibility of technology news website. The resulting credibility scores therefore allow a website administrator to optimize his/her site for those users that primarily interact with the website of the administrator. FIGS. 3 and 4 below present different processes 300 and 400 for defining the credibility scoring rules in accordance with some embodiments.

In some embodiments, the analyzer 230 performs the classification by processing content within some of the parsed elements. Specifically, products, services, or certain keywords can be used to perform the classification. For example, if the words "travel" and "vacation" appear throughout the content of a first website, the analyzer 230 can classify the website as one that relates to a first category of "leisure" and a second category of "services"; if the words "buy", "Xbox", and "Playstation" appear throughout the content of a second website, the analyzer 230 can classify the website as one that relates to a first category of "entertainment", a second category for "males age 15-40", and a third category for "e-retailers". Other website elements from which the website may be classified include the types of advertisements appearing in the website, references to businesses or persons, the domain name of the website, and domain names of embedded hyperlinks as some examples. In some embodiments, website classification is performed with reference to a dictionary that provides a classification based on the domain names of the websites. Websites can be classified with a desired level of granularity. The examples above illustrate some gradations with which websites can be classified. Because of the varied websites in existence today, it will be apparent to one of ordinary skill in the art that a complete listing for how to classify a website is beyond the scope of this discussion.

Based on the determined classifications, the analyzer 230 retrieves a set of credibility scoring rules from the credibility scoring database 240. The retrieved set of credibility scoring rules will have been derived from or are otherwise associated with websites that are similarly classified as the retrieved website. Derivation of the credibility scoring rules is further described with reference to FIGS. 3 and 4 below.

The analyzer 230 then matches the parsed website elements to the appropriate credibility scoring rule from the retrieved set of credibility scoring rules. This involves providing the appropriate parsed website elements and optionally corresponding attributes of the elements as inputs to the credibility scoring rules. As output, the credibility scoring rules generate credibility scores, wherein each credibility score represents a component credibility score for a particular aspect or factor of the website that is identified from the website element that is provided as input. Each credibility scoring rule is encoded with an algorithm that (1) quantifies attributes or features of one or more inputted website elements into a score or (2) quantifies a website element into a score based on the presence or omission of that element from the website. The generated credibility scores are associated back to the website elements that were used as inputs.

In addition to the credibility scores computed for each of the website elements, the analyzer 230 also computes an overall credibility score to quantify the credibility of the website as a whole. The overall credibility score is derived for a website from each of the component credibility scores that were computed for that website. Since users are impacted by some website elements more heavily than others, the analyzer 230 may weight different component credibility scores differently when computing the overall credibility score for the website. In some embodiments, these weights are associated with the credibility scoring rules when the credibility scores are derived. For example, if a particular website element is identified by all users in the primary demographic of users as critically important to the credibility of a website, then any component credibility scores that are produced as a result of credibility scoring rules that accept that website element as input will be weighted more heavily. The resulting overall credibility score for the website is associated with the component credibility scores and the scores are stored to the credibility score database 250. The association allows for rapid transitioning from the overall credibility score of a website to its component credibility scores in order to directly identify those website elements that beneficially or detrimentally impact the overall credibility score for the website.

In some embodiments, one or more of the component credibility scores are derived from information that is obtained from third party sources where the obtained information relates to website credibility. This may involve aggregating user reviews about different websites from a particular website review site and then quantifying the aggregated reviews into a component credibility score. In some embodiments, quantifying a review involves adjusting, standardizing, or normalizing the scale of the review when the review is already some quantifiable measure such as a 0 out of 5 rating or ranking. In some embodiments, quantifying a review involves subjecting the review to natural language processing whereby specific words conveying different degrees of positivity and negativity are quantified into a component credibility score. Other information that can be used to compute a component credibility score from a third party source may include Facebook likes for a particular website. Different credibility scoring rules can be encoded to generate component credibility scores for such information.

C. Credibility Scoring Rules Database

The credibility scoring rules database 240 stores the different sets of credibility scoring rules that are used to quantify website elements into component credibility scores. The credibility scoring rules are defined according to at least one of two processes that are described with reference to FIGS. 3 and 4 below. However, it should be apparent that other processes may be used to define other credibility scoring rules.

FIG. 3 presents a first process 300 implementing a judgmental approach to defining credibility scoring rules in accordance with some embodiments. The process 300 begins by identifying (at 310) a sample set of websites that are similarly classified. The sample set of websites may be specified by a system administrator or automatically aggregated using a set of search results that appear within a search engine when the search engine is queried with one or more terms pertaining to the sample set. For example, a sample set of websites that is aggregated when searching for the term "news" includes: www.cnn.com, www.foxnews.com, news.google.com, news.yahoo.com, and www.msnbc.msn.com.

The process presents (at 320) the sample set of websites to a group of users that are within the primary demographic of users accessing the sample set of websites. In some embodiments, the websites are presented as is to the primary demographic of users. In some embodiments, the websites are presented with various elements of the websites highlighted or otherwise identified. The highlighting focuses the attention of the users to those highlighted website elements so that specific feedback can be obtained from the users on those elements as opposed to other elements. To perform the highlighting, the process analyzes each website of the sample set of websites to identify elements of interest that are contained by the websites. The websites may then be presented to the primary demographic of users with various overlays to highlight the identified elements of interest. An overlay may include bordering, coloring, or callouts that distinguish the elements of interest from other elements appearing on the websites. The primary demographic of users may be identified based on information obtained from the websites or may be identified by temporarily monitoring the websites by the PEO system. The users may be volunteers or people that are enlisted to formulate the credibility scoring rules for the PEO system. It should be apparent that in some embodiments the sample set of websites does not need to consist of similarly classified websites and that the group of users does not need to include a primary demographic of users for the sampled websites. Instead, the sample set of websites can include any random assortment of websites and the group of users can similarly include any random assortment of users.

The process obtains (at 330) input from the group of users. The input specifies whether, in the perception of the users, a presented website element beneficially or detrimentally impacts the credibility of the website and the degree to which the website element impacts the credibility of the website. More specifically, the input quantifies how an attribute that is selected for that element impacts the credibility of the website. As an example, the website element may include the background coloring of the website and the attribute is the color red that is used for the background coloring of the website. Users then quantify the credibility that is associated with the background coloring of the website by specifying a numeric value in a range of numeric values to represent the credibility contribution for that particular website element. In some embodiments, obtaining (at 330) user input involves providing a questionnaire alongside each of the presented websites in the sample set. The websites and the questionnaire may be presented in any web browser by having the users direct their web browsers to a particular URL (e.g., credibilityscoring.com/classification24). The questionnaire in conjunction with or independent of the above described highlighting or other overlays may focus on particular website elements such as the coloring, font, graphics, advertisements, etc. and provide a scale for the user to rate how they perceive each such element impacting the credibility of the website. As the user completes the questionnaire for a first website of the sample set of websites, a second website of the sample set of websites is presented with a clean version of the questionnaire. In some embodiments, the PEO system allows the users to freely comment on different website elements using a free form input box. In addition to rating the element and attribute for the element of the presented website, users may be permitted to specify alternate attribute(s) for that element that would improve or degrade credibility. For instance, a user may provide a 5/10 credibility score for the six advertisements that appear on a web site and the user may further specify that a credibility score 10/10 would be attainable if there were two or fewer advertisements on the website.

From the user inputs, the PEO system develops a knowledgebase of website elements and the corresponding attributes of those elements that most beneficially and detrimentally impact the credibility of sampled websites that are representative of different website classifications. Using the knowledgebase, the PEO system can analyze and compute the credibility for other websites based on commonality that is shared between the website elements of the other websites and the website elements recorded in the knowledgebase. Specifically, the process identifies (at 340) commonality between the aggregate set of user provided input. When a sufficient number of users provide similar input regarding the same website element or the same website, then that commonality is encoded into a credibility scoring rule. For example, when at least ten users in the group of users specify a score of three or lower for a red background color of websiteX and at least ten users specify a score of eight or higher for a blue background color of websiteA, then that commonality is encoded into a credibility scoring rule that produces a component credibility score for the background color website element of other similarly classified websites. With a sufficient sampling, the process is able to determine one or more attributes that maximize credibility for a specific website element and one or more attributes that minimize credibility for a specific website element with various other attributes in between.

The process encodes (at 350) the identified commonality into one or more credibility scoring rules. Encoding identified commonality into a credibility scoring rule comprises defining an algorithm that quantifies one or more website elements, attributes/parameters of a website element, or functionality of a website element into a component credibility score where the range of the score is determined from user preferences. For example, when an attribute for a website element is rated a value of 8 on a scale of 0-10 by a majority of users, then other websites having that attribute or a similar attribute will be provided a component credibility score of 8. In some embodiments, each credibility scoring rule is defined to generate a component credibility score on a standardized and/or normalized scale. For example, each credibility scoring rule can generate a component credibility score ranging in value from 0-10. A credibility scoring rule can be encoded without the users having defined scores for each possible attribute. In some such embodiments, the PEO system requires the specification of an attribute for a high or maximum score and the specification of an attribute for a low or minimum score and the PEO system fills in the remainder of the scores for other attributes based on similarities of the other attributes to those for which scores have been defined by the users. Extrapolation techniques can be adapted for this role and for fully defining the range of values for a credibility scoring rule when only part of the range of scores have been defined for that credibility scoring rule.

The credibility scoring rules are associated (at 360) with one or more particular classifications such that the credibility scoring rules are used to compute component credibility scores for websites that fall within the same classification. In this manner, different sets of credibility scoring rules are used to compute component credibility scores for differently classified websites such that the credibility scoring rules applied to a particular website are derived from a group of users that best match the primary demographic of users interfacing with the particular website. The process stores (at 370) the credibility scoring rules to the credibility scoring rule database 240 for subsequent use in computing component credibility scores for similarly classified websites. When the credibility scoring rules from the credibility scoring rule database 240 are used to compute component credibility scores and an overall credibility score for a particular website, the scores are associated with the particular website and stored back to the credibility scores database 250.

FIG. 4 presents a second process 400 implementing an empirical approach to defining credibility scoring rules in accordance with some embodiments. The process 400 begins by identifying (at 410) a sample set of known credible and/or non-credible websites that are similarly classified. The sample set may be specified by a PEO system administrator or based on monitoring a set of similarly classified websites. For example, a sample set of known credible websites of a particular classification may be identified based on aggregated positive reviews, website popularity, etc. Stated differently, websites in a set of similarly classified websites that receive the most traffic may be determined to be credible and those receiving the least traffic may be determined to be non-credible. Other methods may be used to specify the sample set of credible and non-credible websites. A sample set of known credible websites classified as news websites may include www.cnn.com and www.foxnews.com.

The process automatedly identifies (at 420) commonality for different website elements between these known credible and/or non-credible websites. Commonality that is identified between the known credible websites is used to define credibility scoring rules that generate a high component credibility score for other websites having similar elements and commonality that is identified between the known non-credible websites is used to define credibility scoring rules that generate a low component credibility score for other websites having similar elements. Specifically, when a known credible website contains a website element with a particular attribute and another website whose credibility is being determined contains the same website element with the same or similar particular attribute, then the component credibility score for that website will be similar to that of the known credible website. Visual scanners or other automated techniques may be employed to automatedly identify the commonality between the different sample sets of websites. In some embodiments, a configuration file specifies a list of website elements to consider and compare. This may include comparing attributes of different website elements such as the fonts, font sizes, and coloring, and also comparing counts for the number of times certain website elements appear such as the number of advertisements on a website and the number of links appearing on the website. Other such website elements may be specified and compared. Additionally, manual analysis may be conducted by PEO system administrators to identify the commonality.

As with process 300, the process encodes (at 430) the identified commonality into one or more credibility scoring rules. In encoding a credibility scoring rule, the process specifies scores for an attribute that may not be represented in the known credible and known non-credible websites by computing a score based on how closely the attribute matches to attributes of the known credible and known non-credible websites. For example, a sample set of known credible websites are identified to have two advertisements on average and a sample set of known non-credible websites are identified to have six advertisements on average such that a credibility scoring rule is encoded to output a credibility score of 10/10 for similarly classified websites with two or fewer advertisements and a credibility score of 0/10 for similarly classified websites with six or more advertisements. The credibility scoring rule further defines scores for websites having between two and five advertisements. For example, a similarly classified website with three advertisements causes the encoded credibility scoring rule to output a score of 7 on a scale of 0-10 and a second similarly classified website with five advertisements causes the encoded credibility scoring rule to output a score of 3 on a scale of 0-10. Therefore, other websites having similar attributes for the website elements of the sample set of known credible websites will receive higher credibility scores than other websites with dissimilar attributes for the website elements.

The credibility scoring rules are associated (at 440) with one or more particular classifications and the process stores (at 450) the credibility scoring rules to the credibility scoring rule database 240 for subsequent use in computing component credibility scores for similarly classified websites. When the credibility scoring rules from the credibility scoring rule database 240 are used to compute component credibility scores and an overall credibility score for a particular website, the scores are associated with the particular website and stored back to the credibility scores database 250.

III. Credibility Score Uses

This section details the various uses for the credibility scores that are computed using the credibility scoring rules and that are stored to the credibility score database 250. The overall credibility score and each component credibility score serve various uses depending on who views the scores. More specifically, the scores provide different advantages to website administrators, users viewing the websites that have been scored, and search engines that assimilate the scores as part of their results as some examples.

The overall credibility score informs the administrator as to how credible its website is in comparison to those of its competitors (i.e., other similarly classified websites). The component credibility scores then particularly point out which website elements beneficially impact the credibility of the website and which website elements detrimentally impact the credibility of the website.

Figure 5:
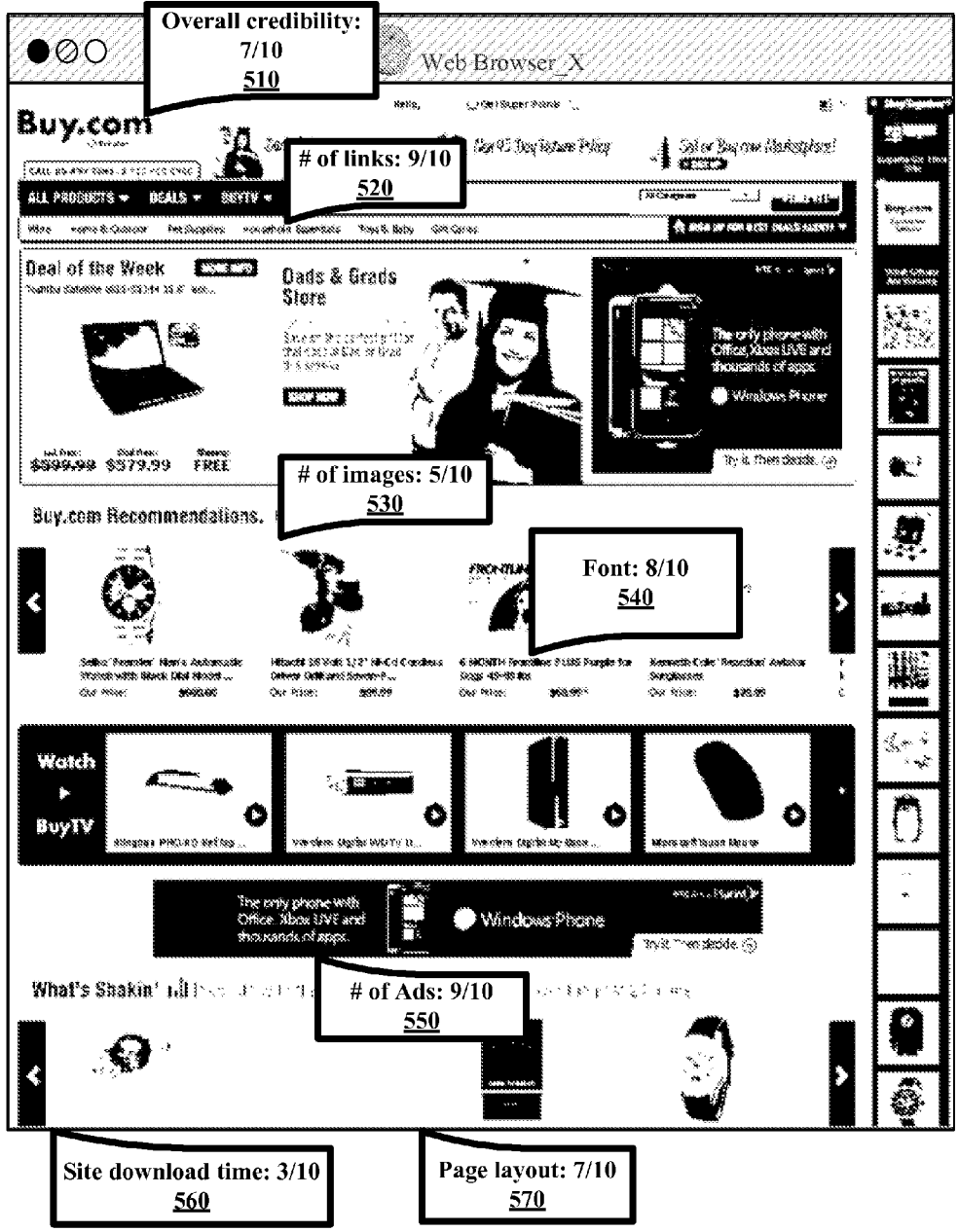
FIG. 5 illustrates presenting credibility scores to a particular website administrator in accordance with some embodiments.

FIG. 5 illustrates presenting credibility scores to a particular website administrator in accordance with some embodiments. In this figure, the overall credibility score 510 for the website and its component credibility scores 520, 530, 540, 550, 560, and 570 are overlaid onto the website. Each credibility score 510-570 is presented with a short textual descriptor for specifying the website element that it pertains to and the corresponding quantified score for that website element. In some embodiments, each of the credibility scores 510-570 is interactive such that the administrator can click on a particular component credibility score in order to obtain more information about the score. Such information may include details on how to improve a website element that is associated with a particular component credibility score or may include examples of other similar website elements that are quantified as highly credible in order to provide direct reference for the website administrator. The detailed information or examples for improving a particular component credibility score can be obtained from the credibility scoring rule that was used to score the website element. Specifically, the credibility scoring rule is encoded with one or more attributes that produce high credibility scores for the website element and those attributes can be presented by the PEO system to the website administrator for reference.

In some embodiments, the PEO system provides its own website whereby website administrators can search for the credibility scores for their administered websites. Specifically, an interface portal of the PEO system is accessible at a specific domain name or URL operated by the PEO system (e.g., www.credibiltyscoring.com). Once a web browser is directed to the PEO system portal, the website administrator can search for a specific administered website by specifying the domain name or URL of that website. The PEO system then queries the credibility score database 550 to retrieve and present the scores to the administrator in the overlay view of FIG. 5 or via some other presentation. In some embodiments, the PEO system can restrict access to the credibility scores to only the website administrators of the websites. In some such embodiments, a website administrator accesses the PEO system portal and logs in using identifying credentials (e.g., username and password). Using the identifying credentials, the PEO system queries the credibility score database 250 in order to identify and present the credibility scores for the website(s) that are administered by the website administrator. In some other embodiments, the credibility scores for any website are available to all users.

When the receiving entity is a user, the credibility scores serve to inform the user as to a website's credibility. Users that are less online savvy can have a better online experience by using the independently derived credibility scores of the PEO system to guide them in their online browsing and to help them avoid websites that have been determined to be not credible.

Figure 6:
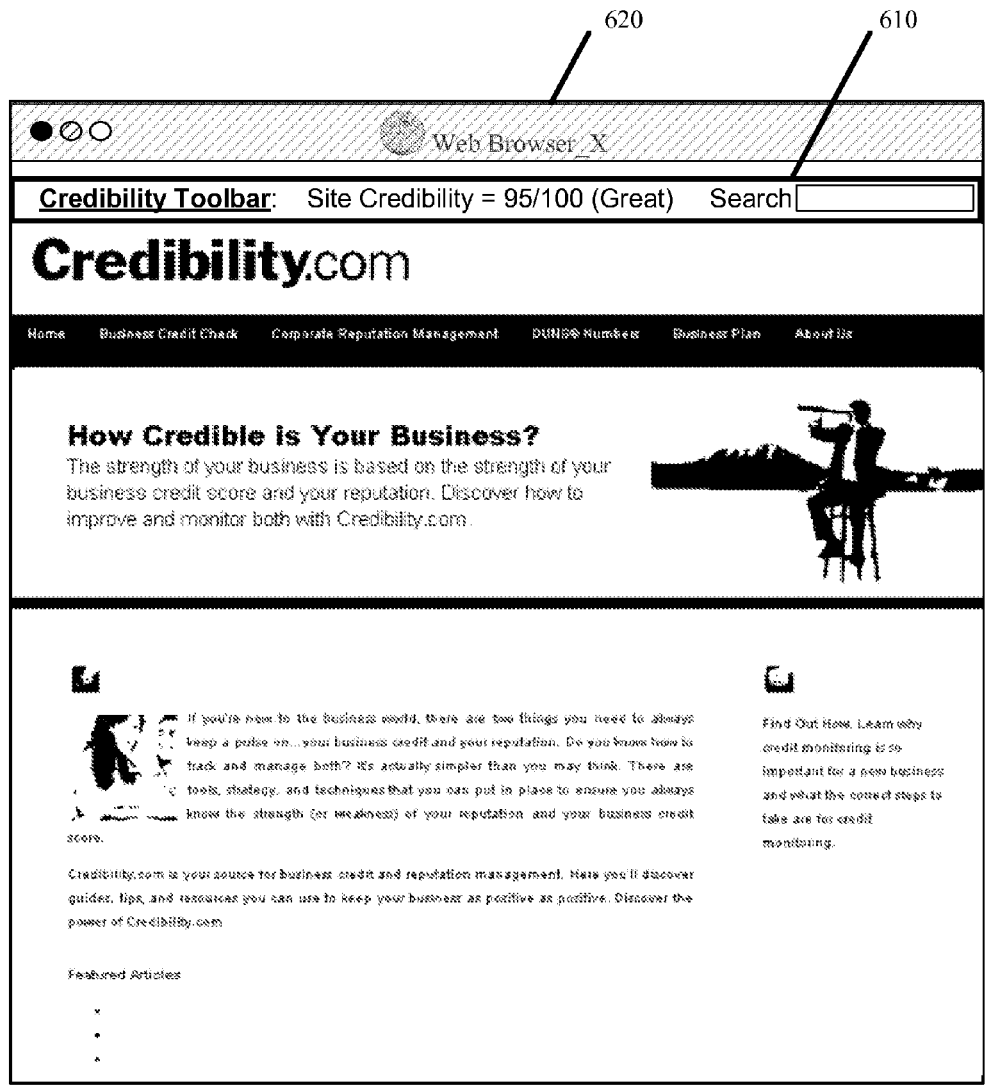
FIG. 6 illustrates a toolbar within a browser window for providing credibility scores to users in accordance with some embodiments.

FIG. 6 illustrates yet another method of providing credibility scores to users. In this figure, a toolbar 610 is included within the browser window 620. When a website is loaded and displayed in the browser window 620, the toolbar 610 automatically queries the credibility score database 250 to identify one or more credibility scores for the displayed website. As the user navigates to different websites, the toolbar 610 displays the credibility score for that website, thereby ensuring that the website is credible or putting the user on notice that the website may potentially include non-credible elements. In some embodiments, the toolbar 610 provides additional functionality whereby the user can obtain more detailed credibility information about a website. The toolbar 610 may also be presented in conjunction with the overlaying of credibility scores.

Figure 7:
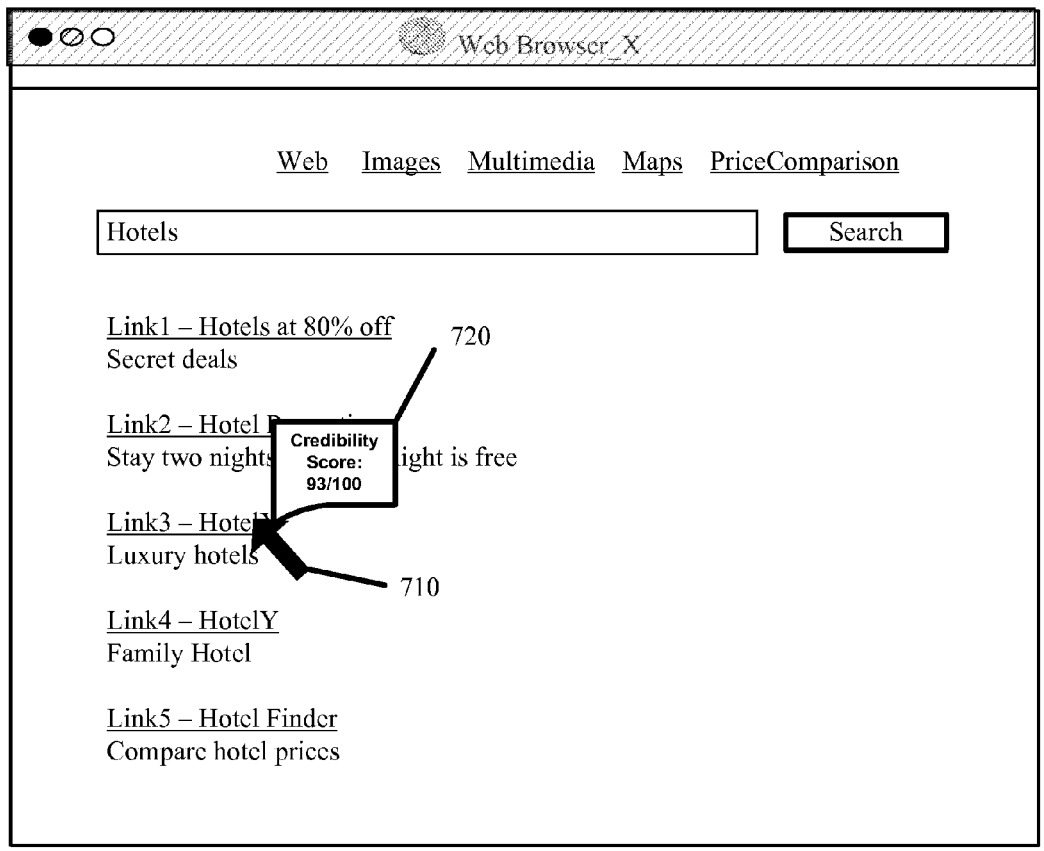
FIG. 7 illustrates using "mouse-over" functionality to present credibility scores in accordance with some embodiments.
Figure 8:
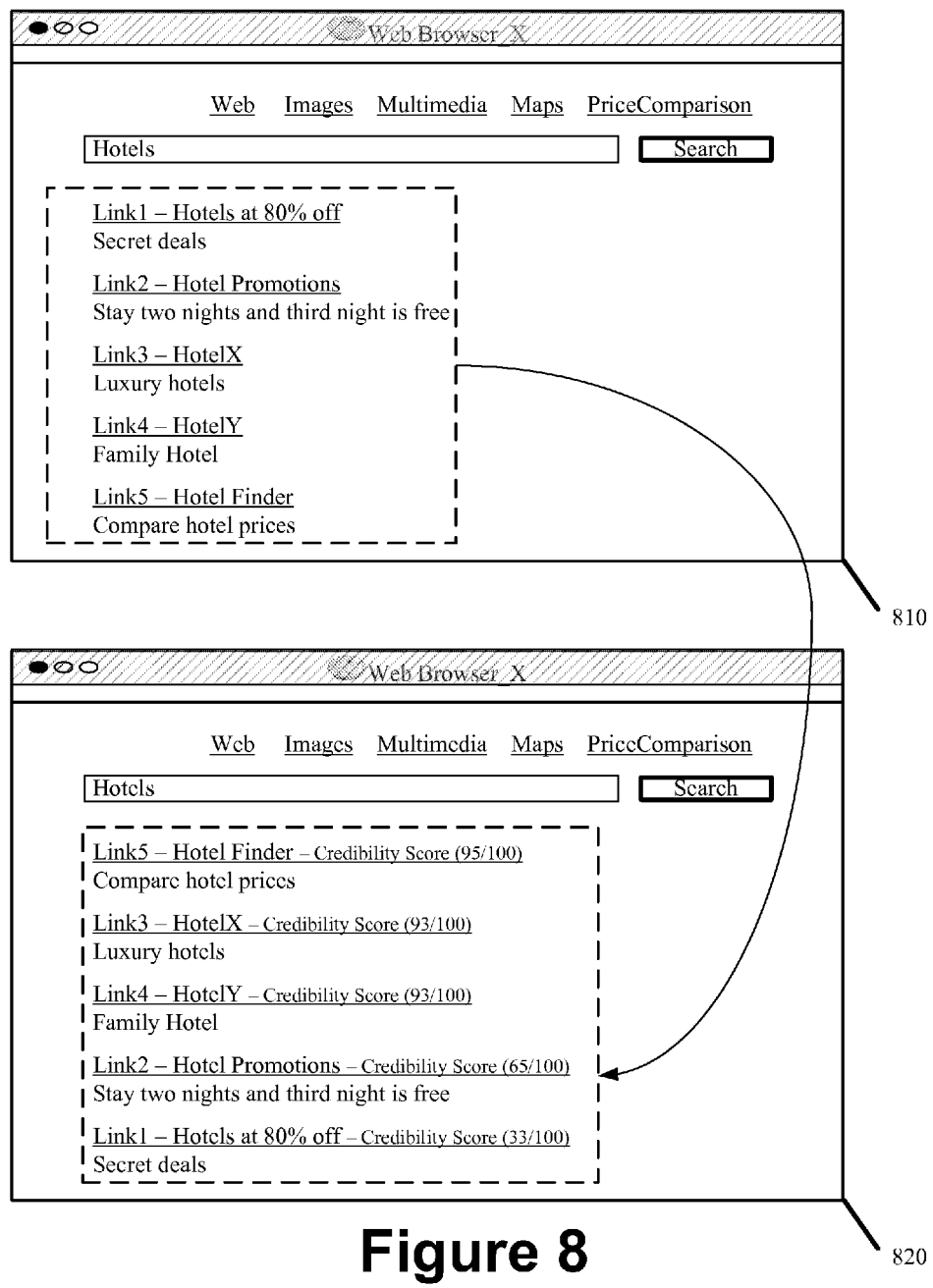
FIG. 8 illustrates reordering search engine results based on credibility scores in accordance with some embodiments.

In some embodiments, the credibility scores are integrated with search engine results. FIGS. 7 and 8 illustrate two alternatives for integrating credibility scores into search engine results. FIG. 7 illustrates using "mouse-over" functionality to present credibility scores in accordance with some embodiments. When a user places a pointing tool, such as mouse cursor 710, for a specified duration (e.g., 500 milliseconds) over a website link that is part of a search engine query, an indicator window 720 displays showing the credibility score (s) for that website. To do so, the search engine may associate the credibility scores with the website links before returning the results to the web browser. Alternatively, the search engine results may be intercepted by the PEO system prior to being returned to the web browser. The intercepted results are associated with the appropriate credibility scores and then passed to the web browser. The integration of the credibility scores with the search engine results allow a user to identify the credibility of a website prior to accessing that website. In this manner, the user can avoid non-credible websites that are presented within search engine results.

FIG. 8 illustrates reordering search engine results based on credibility scores in accordance with some embodiments. This figure illustrates regular search engine results in window 810 and the same set of search engine results in window 820 that have been reordered based on the credibility scores that are associated with each of the results. Furthermore, the links for the search results have been appended with a credibility score in window 820. In this manner, users can visualize the quantified credibility score for each of the websites before clicking on or hovering over the links. Moreover, non-credible websites have been ranked lower in the results to discourage users from accessing those sites.

In some embodiments, partnerships are established between the search engine and the PEO system to allow the search engine access to the credibility scores and to allow the search engine to reorder their results based on the credibility scores prior to passing the results to the user. In some embodiments, the PEO system intercepts the search engine results and reorders the results based on the credibility scores before passing the reordered results to the user. In still some embodiments, the PEO system is integrated with one or more search engines such that the search engine algorithms automatically account for a website's credibility when determining the website's ranking in a set of results to be returned to a user.

The foregoing has been an exemplary set of website credibility score uses. Other uses of credibility scores not explicitly mentioned herein are nevertheless within the scope of the PEO system and such uses can be applied by accessing the credibility scores from the credibility score database 250 of the PEO system.

IV. Computer System

Many of the above-described processes and modules are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Computer and computer system are meant in their broadest sense, and can include any electronic device with a processor including cellular telephones, smartphones, portable digital assistants, tablet devices, laptops, desktops, and servers. Examples of computer-readable media include, but are not limited to, CD-ROMs, flash drives, RAM chips, hard drives, EPROMs, etc.

Figure 9:
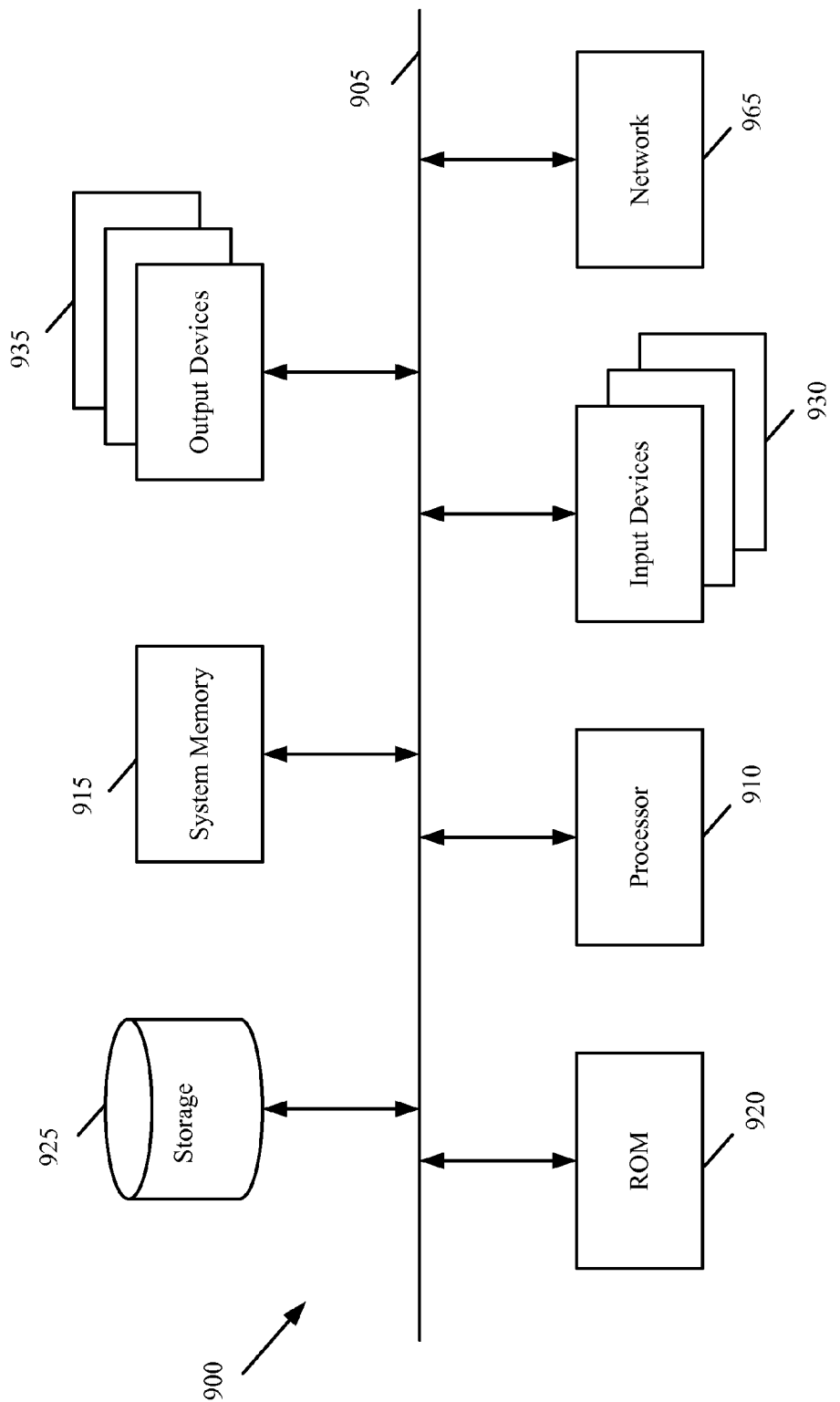
FIG. 9 illustrates a computer system with which some embodiments are implemented.

FIG. 9 illustrates a computer system with which some embodiments are implemented. Such a computer system includes various types of computer-readable mediums and interfaces for various other types of computer-readable mediums that implement the various processes, modules, and engines described above (e.g., website retrieval process, analyzer, etc.). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device. Like the permanent storage device 925, the system memory 915 is a read-and-write memory device. However, unlike the storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include any of a capacitive touchscreen, resistive touchscreen, any other touchscreen technology, a trackpad that is part of the computing system 900 or attached as a peripheral, a set of touch sensitive buttons or touch sensitive keys that are used to provide inputs to the computing system 900, or any other touch sensing hardware that detects multiple touches and that is coupled to the computing system 900 or is attached as a peripheral. The input devices 930 also include alphanumeric keypads (including physical keyboards and touchscreen keyboards), pointing devices (also called "cursor control devices"). The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers such as a local area network ("LAN"), a wide area network ("WAN"), or an Intranet, or a network of networks, such as the internet. For example, the computer 900 may be coupled to a web server (network 965) so that a web browser executing on the computer 900 can interact with the web server as a user interacts with a GUI that operates in the web browser.

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for computing website credibility, the method comprising:

with at least one server of a scoring system comprising a processor and non-transitory computer-readable memory storing instructions which when executed by the processor perform:

identifying a set of known credible websites from a plurality of websites, wherein each website of the set of known credible websites comprises a similar set of elements;

defining a credibility scoring rule for at least a particular element of the similar set of elements, the credibility scoring rule quantifying credibility of the particular element based on commonality between attributes that the set of known credible websites define for the particular element;

computing a credibility score using the credibility scoring rule for the particular element as defined on a new website that is not in the plurality of websites, wherein the new website defines a particular attribute for the particular element, and wherein computing the credibility score comprises increasing the credibility score based on each additional web site of the set of known credible websites that defines an attribute for the particular element that is similar to the particular attribute; and presenting the credibility score with the particular element of the new website.

2. The method of claim 1 further comprising identifying a set of known non-credible websites from the plurality of websites, wherein each website of the set of known non-credible websites comprises the similar set of elements.

3. The method of claim 2, wherein computing the credibility score further comprises decreasing the credibility score based on each additional website of the set of known non-credible websites that defines an attribute for the particular element that is similar to the particular attribute.

4. The method of claim 2, wherein computing the credibility scoring using the credibility scoring rule is further based on how many websites from the set of known non-credible websites define a similar attribute for the particular element.

5. The method of claim 1, wherein computing the credibility score using the credibility scoring rule further comprises providing a first score for the particular element when at least a threshold number of the known credible websites defines an attribute for the particular element that is similar to the particular attribute and providing a second score that is less than the first score when less than the threshold number of the known credible websites defines an attribute for the particular element that is similar to the particular attribute.

6. The method of claim 1, wherein identifying the set of known credible websites comprises identifying websites from the plurality of websites that exceed a specified number of visitors.

7. The method of claim 1 further comprising presenting a suggested action with which the credibility score for the particular element of new website can be improved.

8. The method of claim 1 further comprising computing a credibility score using the credibility scoring rule for the particular element as defined on each of a plurality of new websites.

9. The method of claim 8 further comprising reordering results of a search engine query based on the credibility score of each website of the plurality of new websites, wherein reordering the results comprises increasing in the results, a rank of a website having a high credibility score and decreasing in the results, a rank of a website having a low credibility score.

10. A method for scoring website credibility, the method performed by a system comprising at least one server with a processor and non-transitory computer-readable memory, the method comprising:

distinguishing by operation of the processor, a set of credible websites from a plurality of websites, each website of the plurality of websites defined in part by a plurality of elements;

determining by operation of the processor, a range of attributes that the set of credible websites defines for a particular element;

determining by operation of the processor, a number of times that each attribute from the range of attributes is defined by the set of credible websites for the particular element;

computing by operation of the processor, a credibility score for the particular element of a new website that is not in the set of credible websites based on a particular attribute that the new website defines for the particular element, wherein computing the credibility score comprises outputting a credibility score connoting positive credibility when the particular attribute is similar to an attribute in the range of attributes and increasing the credibility score based on the number of the set of credible websites that define an attribute similar to the particular attribute; and presenting the credibility score for the new website.

11. The method of claim 10 further comprising presenting the new website with the credibility score adjacent to the particular element.

12. The method of claim 10, wherein the range of attributes is a first range of attributes, the method further comprising determining by operation of the processor, a second range of attributes that a set of non-credible websites defines for the particular element.

13. The method of claim 12 further comprising determining by operation of the processor, a number of times that each attribute from the second range of attributes is defined by the set of non-credible websites for the particular element.

14. The method of claim 13, wherein computing the credibility score further comprises outputting a credibility score connoting negative credibility when the particular attribute is similar to an attribute in the second range of attributes and decreasing the credibility score based on the number of the set of non-credible websites that define an attribute that is similar to the particular attribute.

15. A method performed by a credibility scoring system comprising at least one server with a processor and non-transitory storage, the method for assessing website credibility, the method comprising:

identifying by operation of the processor, a definition that is specified for each element of a set of elements of a particular website;

for each definition that is specified for an element of the set of elements of the particular website, computing a credibility score based on commonality with definitions that a set of credible websites specify for the element; and presenting from the credibility scoring system, credibility of the particular website by presenting a credibility score for each element of the set of elements of the particular website, each credibility score quantifying an impact that a particular element has on overall credibility of the particular website.

16. The method of claim 15, wherein computing the credibility score is further based on a number of the set of credible websites that specify a similar definition to the definition that is specified for a corresponding element of the particular website.

17. The method of claim 15, wherein computing the credibility score comprises increasing the credibility score for a particular element of the set of elements for each additional website of the set of credible websites that defines a similar definition to the definition that is specified for the particular element of the particular website.

18. The method of claim 15 further comprising computing an overall credibility score for the particular website based in part on each credibility score that is computed for each element of the set of elements of the particular website.

19. The method of claim 18 further comprising presenting the overall credibility score in conjunction with presenting the credibility of the particular website.

* * * * *